(12) United States Patent
Clüsserath

(10) Patent No.: US 8,795,604 B2
(45) Date of Patent: Aug. 5, 2014

(54) PASTEURIZATION INSTALLATION

(75) Inventor: Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 627 days.

(21) Appl. No.: 12/994,401

(22) PCT Filed: May 19, 2009

(86) PCT No.: PCT/EP2009/003536
§ 371 (c)(1),
(2), (4) Date: Nov. 23, 2010

(87) PCT Pub. No.: WO2009/149811
PCT Pub. Date: Dec. 17, 2009

(65) Prior Publication Data
US 2011/0085946 A1 Apr. 14, 2011

(30) Foreign Application Priority Data
Jun. 10, 2008 (DE) .......................... 10 2008 027 492

(51) Int. Cl.
*A61L 2/00* (2006.01)
*A61L 9/00* (2006.01)
*B65B 31/00* (2006.01)
*E03B 11/00* (2006.01)

(52) U.S. Cl.
USPC ........... 422/307; 422/292; 422/296; 422/298; 422/305; 141/44; 141/48; 141/56; 141/151; 137/255; 99/205

(58) Field of Classification Search
USPC .................. 422/26, 292, 296, 298, 305, 307; 141/44, 48, 56, 151; 137/14, 247, 255; 426/384, 492, 521, 599; 99/205
See application file for complete search history.

(56) References Cited

U.S. PATENT DOCUMENTS 3,205,078 A * 9/1965 Lund .............................. 426/384
4,463,025 A 7/1984 Strobel

FOREIGN PATENT DOCUMENTS

| EP | 0 100 833 | 2/1984 | |
| EP | 0100833 | * 2/1984 | ................ A23L 2/06 |
| WO | 2007/042593 | 4/2007 | |

OTHER PUBLICATIONS

European Patent Office Machine Translation of the Description section of EP 0100833.*
New Solutions for the Beverage Industry. GEA Diessel GmbH (2008)2 pages.
Bohne Gerhard "Current Technologies Used to Mix Drinks" (2008) GTM Apr. 2006. 2 pages.
"Concepts for Soft Drink Manufacutre" Krones. (2005) 8 pages.
Database FSTA [online] International Food Information Service (IFIS), Frankfurt-Main, DE; 2008; Torres, et al., "*Improvement of the fresh taste intensity of processed Clementine juice by separate pasteurization of its serum and pulp*", XP002544001; Database accession No. 2009-00-h2544 abstract.

* cited by examiner

*Primary Examiner* — Monzer R Chorbaji
(74) *Attorney, Agent, or Firm* — Occhiuti & Rohlicek LLP

(57) ABSTRACT

The invention relates to a novel installation for providing a product in pasteurized form, said product comprising at least one liquid component and fibrous and/or solid components.

21 Claims, 1 Drawing Sheet

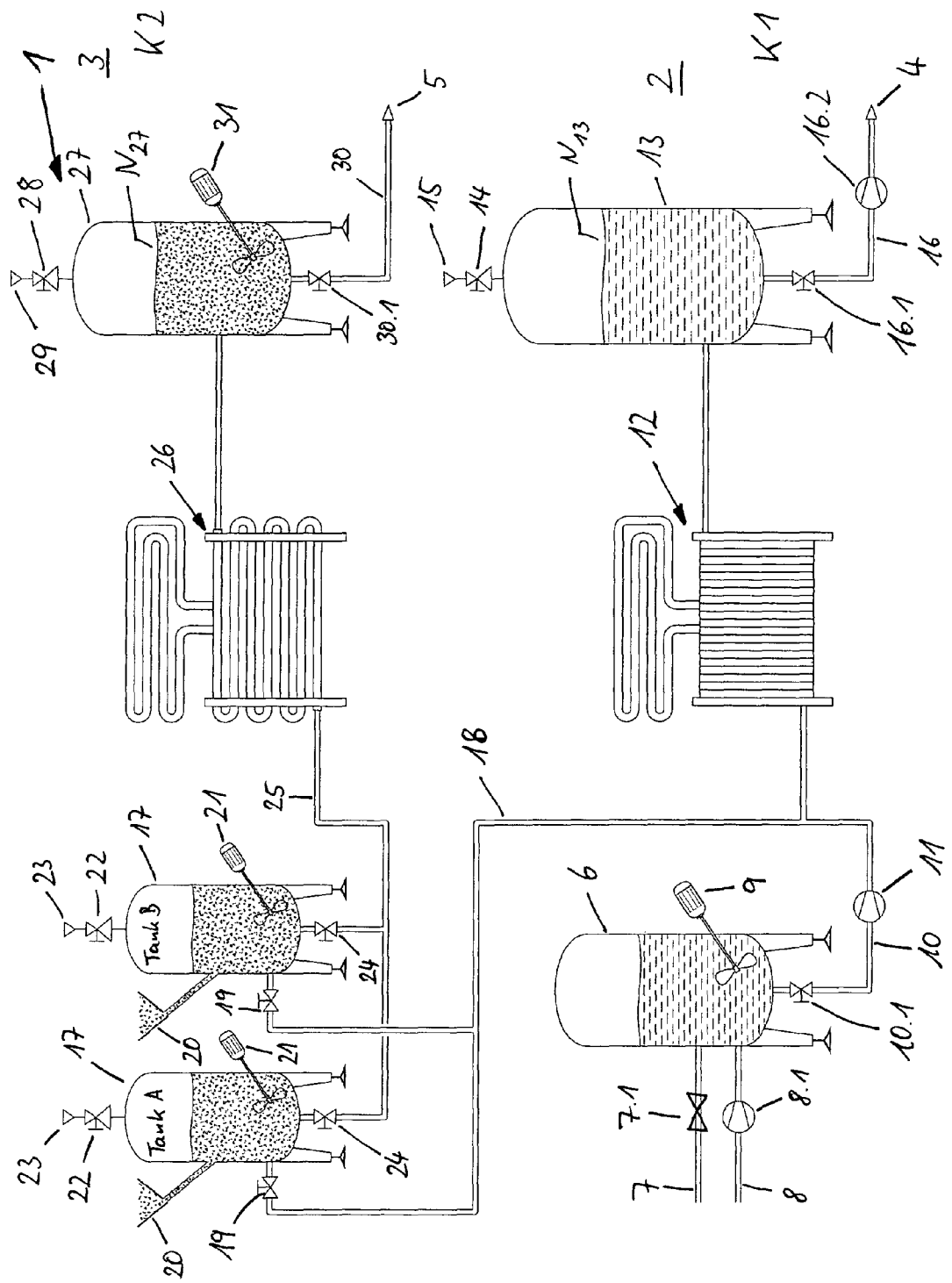

PASTEURIZATION INSTALLATION

CROSS-REFERENCE TO RELATED APPLICATIONS

This application is the National Stage of International Application No. PCT/EP2009/003536, filed on May 19, 2009, which claims the benefit of German Application Serial No. 10 2008 027492.5, filed on Jun. 10, 2008, the contents of both of the foregoing applications are hereby incorporated by reference in their entirety.

The invention relates to a system according to the preamble of Claim 1.

Products that contain a liquid constituent and in addition fibrous and/or solid or more solid constituents are also known in particular as beverages, for example in the form of fruit juices with fruit cells and/or fruit pulp and/or fruit pieces, such as, for example, orange juice with fruit pulp etc. It is also known to fill such products in hot sterile or in pasteurized form into bottles or into other containers to obtain the necessary shelf life, for example using a filling machine of the rotating type, to which the respective product is then supplied as a finished mixture of its constituents after passing a device for pasteurizing or heating.

It is the object of the invention to provide a system which makes it possible to prepare and/or to process a product in a simplified manner, for example in a filling machine, said product comprising at least one liquid constituent and at least one fibrous and/or solid constituent. This object is achieved by a system corresponding to Claim 1.

One characteristic of the system according to the invention is that said system prepares the at least one liquid constituent as a first component and the fibrous and/or solid constituents in a highly concentrated form mixed with a liquid constituent at at least one second outlet as a second component, such that said components can be supplied separately to a subsequent system or machine, for example to a subsequent filling machine, and are not combined or mixed until this point, for example directly prior to being introduced into and/or when being introduced into a container and/or only when they are in the respective container. To prepare the second component, the fibrous and/or solid constituents are gently prediluted or premixed with a liquid constituent, for example with a proportion of the first component until the mixture containing the fibrous and/or solid constituents is free-flowing.

By preparing the components separately it is also possible, in particular, to heat up said components inside the system in independent devices, for example in independent heat exchangers, for pasteurizing or sterilizing, with the crucial advantage being that said devices can be optimally adapted to the components. Thus, for example, a plate heat exchanger, which enables a high throughput (heated volume per unit time) and is highly efficient, can be used as the device for pasteurizing and sterilizing the liquid component, whereas, as the device for pasteurizing or sterilizing the second component, a heat exchanger is used, which, although it has a lower throughput does have an effective flow cross section that is sufficiently large for the fibrous and/or solid constituents.

In order to avoid corrosion of the structure of the fibrous and/or solid constituents, the system according to the invention is additionally developed in a preferred manner such that there are no mechanical pumps provided in the flow path of the second component inside the system, nor in the connection between the at least one second outlet and a subsequent machine or system, but rather the conveying of the second component is effected exclusively by means of the pressure of a sterile gaseous and/or vaporous pressure medium.

Further developments, advantages and applications of the invention are produced from the subsequent description of exemplary embodiments and from the Figures. In this case, all features described or graphically represented, individually or in arbitrary combination, are in principle objects of the invention, irrespective of their summary in the claims or their dependency. The content of the claims is also made a component of the description.

The invention is explained in more detail below by way of the FIGURE which shows a schematic functional representation of a system 1 for preparing two components K1 and K2 of a product to be filled into containers, for example into bottles.

In the case of the embodiment represented, the system 1 essentially comprises two system portions 2 and 3, of which the system portion 2 prepares at its outlet 4 the component K1 in the form of a liquid product, e.g. in the form of the liquid constituent of a fruit juice, and the system region 3 prepares at its outlet the component K2, which contains fibrous and/or solid and/or more solid constituents, for example fruit pieces and/or fruit pulp and/or fruit cells mixed with a small proportion of the liquid component K1, such that the component K2 is just free-flowing.

Both components K1 and K2, which have been sterilized or pasteurized in the system 1 by means of the effect of heat, are supplied separately to a filling machine (not shown) or to fill positions at that location, each of which being provided with a filler element. The mixing or combining of the two components K1 and K2 is then effected, for example, in the respective filler element or in a preliminary or mixing chamber of the respective filler element or of the filling machine and/or in the liquid product stream flowing to the respective container and/or in the respective container.

To prepare the first component K1, the system portion 2 has a mixing tank 6, to which, in the embodiment represented, water is supplied via a line 7 and via another line 8 a metered concentrate, for example a fruit juice concentrate in the necessary mixture ratio. For this purpose, at least one controllable valve 7.1 is provided in the line 7 and a metering pump 8.1 is provided in the line 8. The mixing of water and concentrate is effected in the mixing tank 6 by means of a mixing device 9.

The mixing tank 6 is connected to the input of a product pump 11 via a line 10 that includes a valve 10.1, said product pump being connected by way of its outlet to a sterile buffer tank 13 by means of, among other things, a heat exchanger 12. When the system 1 is in operation, the sterile buffer tank 13 is filled with the component K1, heated beforehand in the heat exchanger 12 for pasteurising or sterilizing purposes, up to a predetermined level $N_{13}$ such that above the level $N_{13}$ or above the liquid space taken up by the component K1 a gas space is formed which is acted upon with a sterile gaseous and/or vaporous pressure medium, e.g. inert gas, for example $CO_2$ gas from a line 15, controlled by a valve 14, for example pressure controlled. A product line 16, forming the outlet 4, with outlet 16.1 and product pump 16.2, is connected at the bottom of the sterile buffer tank 13.

The system portion 3 comprises two mixing tanks 17, which are connected by way of a branching product line 18 to the outlet of the product pump 11, by means of an inlet valve 19 in each case. Each mixing tank 17 is also provided with a charging or feeding unit 20, which, in the embodiment represented, is essentially formed by a funnel, via which the fibrous and/or solid and/or more solid constituents can be introduced into the respective mixing tank 17. In addition, each mixing tank 17 is provided with a mixing element 21 and is connected via a control valve 22 to a line 23 that conveys a sterile gaseous and/or vaporous pressure medium. In the bottom region, each mixing tank 17 is connected via an outlet valve 24 to a product line 25, which connects the mixing tanks 17 via a heat exchanger 26 to the inlet of a sterile buffer tank 27. During the operation of the system 1, said sterile buffer tank is filled up to a predetermined level $N_{27}$ with the component K2, heated beforehand in the heat exchanger 26 for pasteurizing or sterilizing purposes, such that above the level $N_{27}$ or above the liquid space taken up by the component K2 a gas space is formed, which is connected via a valve 28 with a line 29 that conducts a sterile gaseous and/or vaporous pressure medium.

A product line 30 that has a bottom-side valve 30.1 is connected at the bottom of the sterile buffer tank 27, said product line forming the outlet 5 for the component K2. A mixing device 31 is also provided in the interior of the sterile buffer tank 27.

During the operation, the component K2 is premixed in the mixing tanks 17 by mixing the liquid component supplied via the product line 18 and the fibrous and/or solid constituents supplied via the respective feeding unit 20. In this case, the necessary mixing ratio is set, for example, such that the component K2 obtained is still free-flowing or is just free-flowing. The mixing operation is controlled or regulated by correspondingly opening and closing the valves 19 and by correspondingly actuating the respective feeding unit 20. Once the necessary mixing ratio is obtained in a mixing tank 17 and once the associated valve 19 is closed and the associated feeding unit 20 has been closed off, the gas space of the relevant mixing tank 17 available above the component K2 i.e. the space not occupied by said component, is acted upon with the pressurized sterile gaseous and/or vaporous pressure medium by means of opening the valve 22, such that the component K2, when the outlet valve 24 is opened, can then be introduced via the line 25 and the heat exchanger 26 into the sterile buffer storage means 27. Once the mixing tank 17 has been emptied into the sterile buffer storage means 17, the valves 22 and 24 are closed again which means that the component K2 can be premixed once again from new in the relevant buffer storage means 17.

In order to ensure that the system 1 makes the component K2 available to a high output filling machine to a sufficient extent in spite of the time required for said mixing, the two mixing tanks 17 are preferably operated in alternate mode, i.e. whilst one mixing tank 17 is being emptied via the heat exchanger 26 into the sterile buffer storage means 27, the premixing of the component K2 is carried out in the other mixing tank 17. Segregation of the component K2 in the sterile buffer tank 27 is prevented by the mixing element 31 there. The discharging of the component K2 out of the sterile buffer tank 27 is effected in that the gas space, formed above the level $N_{27}$ in the sterile buffer storage means 27, is acted upon via the open valve 28 with the pressure of the sterile gaseous and/or vaporous pressure medium, such that by opening the bottom valve 30.1 the component K2 is conveyed to the filling machine via the outlet 5.

Characteristics of the system 1, among others, are:

The system 1 makes the two components K1 and K2 available to the subsequent filling machine separately in sterilized or pasteurized form at the outlets 4 and 5, such that the mixing and/or combining of said components is possible at the desired ratio in each case inside the filling machine and/or inside the containers to be filled and/or in the product flow flowing to the containers during the filling process.

The heat exchanger 12 is therefore a highly efficient plate heat exchanger, which, with a reduced installed size, makes it possible to pasteurize or sterilize a large volume of the component K1, i.e. to heat it to the temperature necessary for this purpose of at least 70° C.

The heat exchanger 26, contrary to this, is realized as a tubular heat exchanger, which does have a reduced throughput (heated volume per unit time) compared to the plate heat exchanger 12, but guarantees a relatively large effective flow cross section for the component K2, such that said component, which is in any case only necessary in a smaller proportion compared to the component K1, is able to be premixed with a high proportion of pulp and/or solids.

Whereas product pumps 11 or 15 are provided for the conveying of the component K1, the conveying of the component K2 is effected inside the system 1, but also from the sterile buffer storage means 27 to the filling machine, without any such pumps just by means of the pressure of the sterile vaporous and/or gaseous pressure medium.

In order to ensure that for emptying the respective mixing tank 17, the component K2 flows out of said mixing tank through the heat exchanger 26 into the sterile buffer storage means 27, the pressure of the sterile gaseous and/or vaporous pressure medium, which acts upon the gas space of the respective mixing tank 17, is somewhat greater than the pressure in the gas space of the sterile buffer storage means 27.

It is obvious that the two heat exchangers 12 and 26 are each connected by way of their heating channels to a heating circuit that has a heating device.

The invention has been described above by way of one exemplary embodiment. It is obvious that numerous modifications and conversions are possible without in any way departing from the inventive concept of the invention.

LIST OF REFERENCES

1 System
2, 3 System portion
4, 5 Outlet
6 Mixing tank for component K1
7.1, 8.1 Valves
9 Mixing device
10 Line
10.1 Valve
11 Product pump
12 Heat exchanger
13 Sterile buffer tank
14 Valve
15 Line for pressurized sterile gaseous and/or vaporous medium
16 Product line
16.1 Outlet valve
16.2 Product pump
17 Mixing tank
18 Product line
19 Valve
20 Feeding unit for fibrous and/or solid constituents
21 Mixing element
22 Valve
23 Line for pressurized sterile vaporous and/or gaseous medium
24 Outlet valve
25 Product line
26 Heat exchanger
27 Sterile buffer storage means
28 Valve
29 Line for a sterile gaseous and/or vaporous pressure medium
30 Product line 30.1 Outlet valve
31 Mixing element
K1 Liquid component
K2 Component with a high proportion of fibre and/or solids
$N_{13}$, $N_{27}$ Level

The invention claimed is:

1. An apparatus comprising a system for preparing a product in sterilized or pasteurized form, said product having at least one liquid constituent and at least one fibrous and/or solid constituent, said system comprising at least one first outlet for preparing said liquid constituent as a first component, at least one second outlet for preparing a second component, the second component containing the fibrous and/or solid constituent mixed with a liquid constituent, and first and second independent devices for pasteurizing or sterilizing said corresponding first and second components, wherein said second independent device comprises at least one tubular heat exchanger for the pasteurizing of the second component.

2. The apparatus of claim 1, wherein said first independent device for the pasteurizing or sterilizing of the first liquid component comprises at least one plate heat exchanger.

3. The apparatus of claim 1, further comprising at least one product pump for the conveying of the first component inside the system and/or from the first outlet to a subsequent machine that processes the components.

4. The apparatus of claim 3, wherein said subsequent machine comprises a filling machine.

5. The apparatus of claim 1, further comprising means for conveying of the second component within the system and/or from the at least one second outlet to a subsequent machine exclusively through the pressure of a sterile gaseous and/or vaporous pressure medium.

6. The apparatus of claim 1, further comprising a first system portion having the at least one first outlet, and a second system portion having the at least one second outlet, said second system portion including at least one mixing tank for premixing the second component from a liquid constituent and the fibrous and/or solid constituents, the at least one mixing tank being configured to be acted upon by a sterile vaporous and/or gaseous pressure medium for conveying the second component through the second independent device for sterilizing or pasteurizing.

7. The apparatus of claim 6, wherein the second system portion comprises at least a second mixing tank.

8. The apparatus of claim 6, wherein the first system portion comprises a mixing tank for producing the first component by mixing water and at least one concentrate.

9. The apparatus of claim 1, wherein the at least one first outlet and/or the at least one second outlet, comprises, associated therewith, sterile buffer storage.

10. The apparatus of claim 9, wherein the sterile buffer storage is configured to be acted upon with a sterile gaseous and/or vaporous pressure medium.

11. The apparatus of claim 1, wherein said first independent device comprises a heat exchanger.

12. An apparatus comprising a system for preparing a product in sterilized or pasteurized form, said product having at least one liquid constituent and at least one fibrous and/or solid constituent, said system comprising at least one first outlet for preparing said liquid constituent as a first component, at least one second outlet for preparing a second component, said second component containing said fibrous and/or solid constituent mixed with a liquid constituent, and at least one product pump for conveying of said first component inside said system and/or from said first outlet to a subsequent machine that processes said components, wherein said subsequent machine comprises a filling machine.

13. The apparatus of claim 12, further comprising first and second independent devices for said pasteurizing or sterilizing of said corresponding first and second components.

14. The apparatus of claim 13, wherein said first independent device for said pasteurizing or sterilizing of said first liquid component comprises at least one plate heat exchanger.

15. The apparatus of claim 13, further comprising a first system portion having said at least one first outlet, and a second system portion having said at least one second outlet, said second system portion including at least one mixing tank for premixing said second component from a liquid constituent and said fibrous and/or solid constituents, said at least one mixing tank being configured to be acted upon by a sterile vaporous and/or gaseous pressure medium for conveying said second component through said second independent device for sterilizing or pasteurizing.

16. The apparatus of claim 15, wherein said second system portion comprises at least a second mixing tank.

17. The apparatus of claim 15, wherein said first system portion comprises a mixing tank for producing said first component by mixing water and at least one concentrate.

18. The apparatus of claim 13, wherein said first and second independent devices comprise heat exchangers.

19. The apparatus of claim 12, further comprising means for conveying of said second component within said system and/or from said at least one second outlet to said subsequent machine exclusively through said pressure of a sterile gaseous and/or vaporous pressure medium.

20. The apparatus of claim 12, wherein said at least one first outlet and/or said at least one second outlet, comprises, associated therewith, sterile buffer storage.

21. The apparatus of claim 20, wherein said sterile buffer storage is configured to be acted upon with a sterile gaseous and/or vaporous pressure medium.

* * * * *